Figure 2:
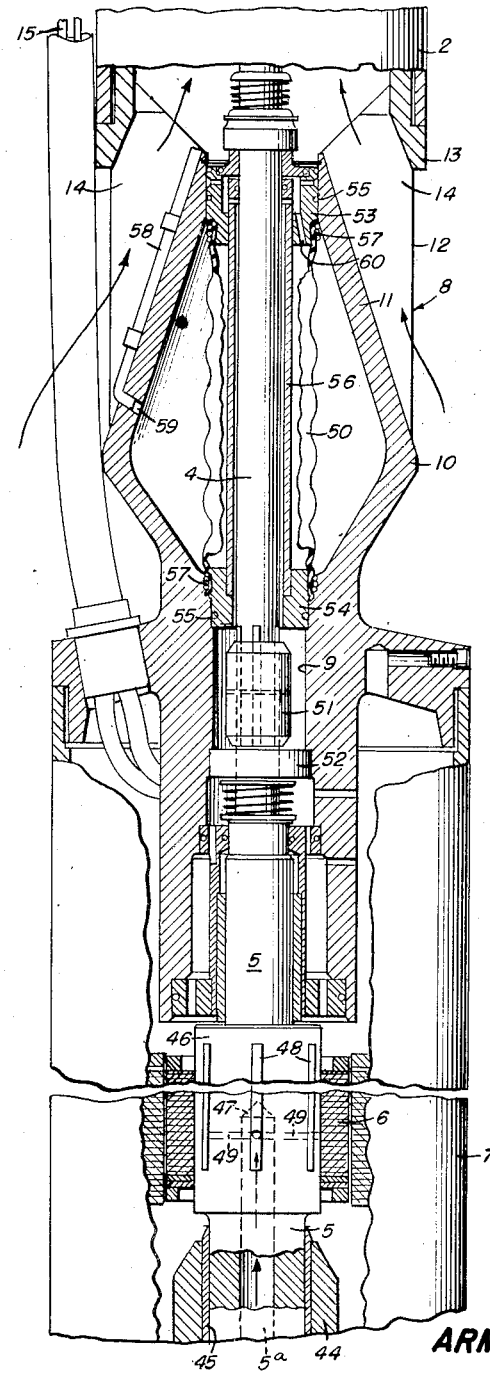

Sept. 30, 1958
A. ARUTUNOFF
2,854,595
MOTOR PROTECTOR AND COOLING SYSTEM
FOR SUBMERGIBLE PUMPING ASSEMBLY
Filed Aug. 8, 1957
2 Sheets-Sheet 1
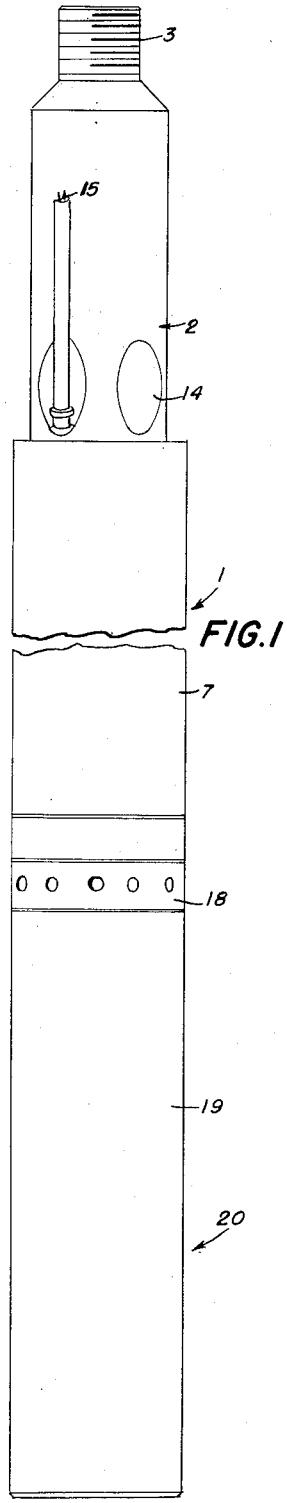
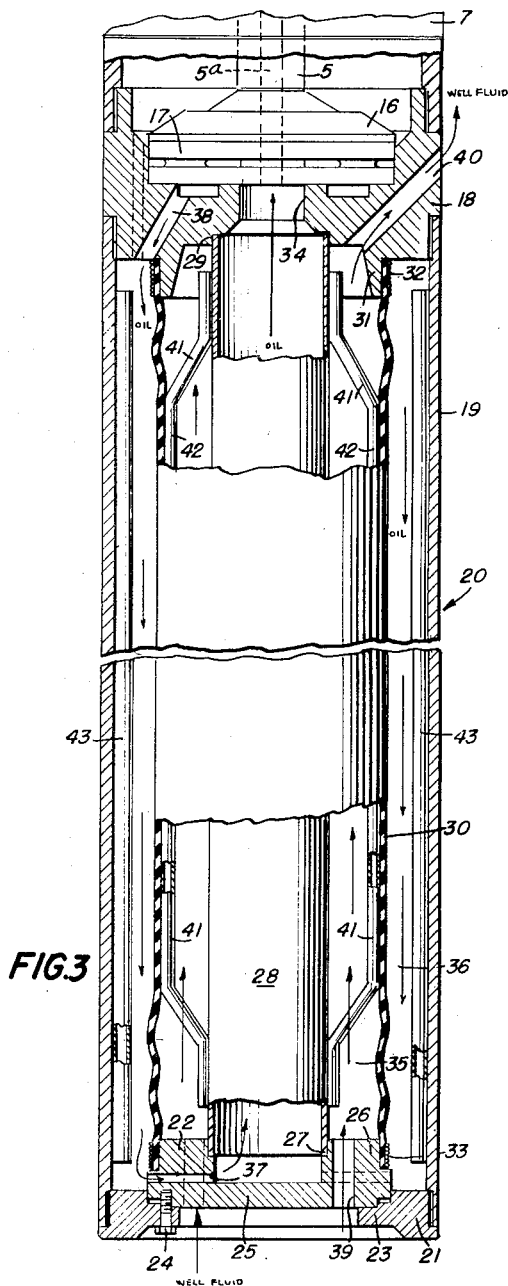
INVENTOR
ARMAIS ARUTUNOFF
BY
ATTORNEY

INVENTOR
ARMAIS ARUTUNOFF

United States Patent Office 2,854,595
Patented Sept. 30, 1958

2,854,595

MOTOR PROTECTOR AND COOLING SYSTEM FOR SUBMERGIBLE PUMPING ASSEMBLY

Armais Arutunoff, Bartlesville, Okla., assignor to Reda Pump Company, Bartlesville, Okla., a corporation of Delaware Application August 8, 1957, Serial No. 677,097

9 Claims. (Cl. 310—87)

This invention relates to a submergible, oil filled electric motor and pump assembly of the type wherein a centrifugal pump unit is coaxially superimposed upon a vertical electric motor unit with the pump shaft operatively connected to the motor shaft and driven thereby. More particularly, the invention consists in new and useful improvements in a motor and pump assembly of this type, including as the lowermost coaxial unit, a combined motor protecting unit and cooling system and heat exchanger.

With pumping assemblies of this type where the electric motor is submerged in a well and operatively connected to the lower end of the casing which houses a coaxial pumping unit, an oil filled lubricating and protecting unit or reservoir is employed in connection with the motor unit and designed to compensate for the normal expansion and contraction of the oil in the motor, resulting from the starting and stopping of the latter. An example of such a protecting unit is illustrated and described in my former Patent No. 2,674,702, issued April 6, 1954, where it is explained that due to this expansion and contraction of the oil in the motor housing, there is a tendency for the surrounding well fluid to leak into the protecting and lubricating reservoir diluting the protecting fluid and ultimately to finding its way along the motor shaft to the motor unit. Hence, it is necessary to a successful operation of the system, to provide some means for insuring against the entrance of damaging moisture into the motor structure. In my said former patent, there is shown a protecting unit comprising a collapsible breather diaphragm which is responsive to the pressure differential between the surrounding well fluid and the lubricating and protecting fluid in the motor unit.

The present invention embodies a protecting unit which from the standpoint of its protecting function, operates on the same principle described in said former patent but which includes in addition, a motor cooling system whereby the lubricating and protecting fluid in the motor unit is caused to circulate through passageways arranged to effect a heat exchange with the surrounding well fluid.

An object of the invention is to provide a protecting unit and cooling system of this character, wherein the breather diaphragm serves the added function of defining the intervening wall which separates two heat exchange passageways, arranged to accommodate the counter current flow of the lubricating and protecting fluid and the surrounding well fluid, respectively.

Another object of the invention is to provide in connection with the motor shaft, centrifugally operated means to facilitate the circulation of the lubricating and protecting fluid through the cooling system.

A further object of the invention is to provide in a protecting unit of this type, means for preventing the complete collapse of the breather diaphragm so as to maintain a normally fixed reserve capacity in the reservoir and to allow for breathing when the motor is initially started and stopped, said means being designed to allow at least a restricted flow of fluids through the respective heat exchange passageways, regardless of the extent of contraction or expansion of the breather diaphragm.

A still further object of the invention is to provide an auxiliary protecting unit operating on the same basic principle but arranged at the upper extremity of the motor shaft to serve as an added precaution against the loss of protecting and lubricating fluid at that point.

With the above and other objects in view which will appear as the description proceeds, the invention consists in the novel features herein set forth, illustrated in the accompanying drawings and more clearly pointed out in the appended claims.

Referring to the drawings, in which numerals of like character designate similar parts throughout the several views, Figure 1 is a view of the assembly in side elevation and partly broken away.

Figure 2 is an enlarged side elevation, partly in section, showing lower end of the pump unit and the upper end of the motor unit which is connected thereto, and Figure 3 is an enlarged transverse sectional view of the combined protecting unit and cooling system which forms the lowermost unit of the assembly.

In the drawings, 1 represents the entire pumping assembly which is inserted in an oil well or the like and includes a housing 2 of a conventional centrifugal pump unit threaded at its upper end as at 3, for connection to a well tubing. The pump per se (not shown) is driven by a pump shaft 4 as shown in Figure 2, which extends downwardly from the pump unit for connection by any suitable means to the upper end of a concentric motor shaft 5. A conventional motor 6 has its rotor supported on the shaft 5 and is enclosed in a motor housing 7, the upper extremity of which terminates in a combination head and base 8. This element 8 which serves the dual function of a top closure for the motor housing and a connecting inlet base for the pump unit 2, preferably consists of a casting which is connected to the upper end of the motor housing 7 and is provided with a central opening 9 to accommodate an extension of the motor shaft 5, for connection to the pump shaft 4. As shown in Figure 2, this casing includes an upstanding hollow head portion 10 which surrounds the opening 9 and terminates at its upper end in a conical wall 11 with integral, radial fin portions 12 serving as connections to a ring 13 which fits within the lower end of the pump housing 2. The converging wall 11, the spaced fins 12 and the ring 13, define fluid inlet passageways 14, leading into the open lower end of the pump unit 2. Electric cables 15 conduct current from a suitable source, to the motor 6.

As seen in Figure 3, the lower end of the motor shaft 5 is supported on the runner 16 of a thrust bearing assembly 17 mounted in a coupling bridge 18 which connects the motor housing 7 to the housing 19 of a combination protecting unit and cooling system generally indicated at 20, which forms the lowermost unit of the motor and pump assembly.

This combination protecting unit and cooling system 20 comprises the cylindrical housing 19, closed at its upper end by the bridge 18 and at its lower end by a base ring 21 and tube adapter 22. The ring 21 and adapter 22 may be formed integrally or, as shown in the drawing, the ring 21 may be provided with an internal annular shoulder 23 to which the adapter is secured by bolts 24. The adapter 22 has a bottom wall 25 which bridges the opening in the ring 21 and is bounded by an upstanding annular neck 26 which is preferably internally recessed as at 27 to receive the lower end of a tube 28, the upper end of which is fitted into an annular recess 29 in the coupling bridge 18.

Surrounding the tube 28 in radially spaced relation is a flexible diaphragm sleeve 30 which is composed of any suitable flexible material such as neoprene which is not vulnerable to attack by either the oil to be used in the reservoir formed by the housing 19 or the fluid in which the pumping assembly is submerged. The upper end of the sleeve 30 embraces a depending annular flange 31 and is secured in place by any suitable means such as by the use of a series of wrappings of waxed linen string 32. The lower end of the sleeve 30 is similarly secured around the periphery of the upstanding neck 26 by means of wrappings 33. Thus, the cylindrical housing 19 is divided into a series of annular, concentric heat exchange passageways, arranged to accommodate the counter current flow of the lubricating and protecting fluid and the surrounding well fluid, respectively.

The tube 28 forms a central passageway communicating at its upper end through an opening 34 in the bridge 18, with the central bore 5a in the motor shaft 5. Immediately surrounding the tube 28 is an annular passageway 35 whose boundaries are defined by the tube 28 and the sleeve 30, respectively, and immediately surrounding the tube 30 is a second annular passageway 36 bounded by the tube 30 and the housing 19, respectively. The outer annular passageway 36 and the passageway formed solely by the tube 28 are in communication through radial ports 37 in the adapter 22 and the upper end of the passageway 36 communicates with the interior of the motor housing 7 through a port or ports 38 extending through the bridge 18. Thus, lubricating and protecting fluid which fills the motor housing 7 and the reservoir formed by the protector housing 19, can circulate from the motor housing through ports 38, downwardly through passageway 36 and return to the motor housing through ports 37 and tube 28 from whence it enters the central bore 5a of the motor shaft 5.

The intermediate annular passageway 35 communicates with the surrounding well fluid through vertical ports 39 provided in the adapter 22 and at its upper end, through a port or ports 40 extending diagonally through the bridge 18 to the well area surrounding the assembly. The surrounding well fluid enters the passageway 35 from its lower end, through ports 39 and flows upwardly in what might be termed double heat exchange relation with the sleeve 30 and tube 28 which are simultaneously directing the flow of the lubricating and protecting fluid traveling from and returning to the motor housing 7.

In order to prevent the complete collapse of the diaphragm sleeve 30 and to maintain a normally fixed oil reserve capacity within the motor and the area of the housing 19 which forms the reservoir for protecting and lubricating fluid and to allow for breathing when the motor is started and stopped, a series of tubular ribs 41 are secured longitudinally on the outer periphery of the tube 28 with their intermediate portions bent radially outwardly from the tube as at 42 to form annularly spaced abutments which control the extent of collapse of the sleeve 30. The ribs 41 being tubular, even though the sleeve 30 is collapsed against the central tube 28 in the areas between the ribs 41, a limited flow of well fluid is permitted to continue through the passageway 35.

Similarly, the outer annular passageway 36 is provided with a series of tubular ribs 43, suitably secured to the inner periphery of the housing 19 and extending longitudinally of the passageway 36. These latter ribs which may be composed of straight tubes as shown in the drawing or bent inwardly toward the sleeve 30, permit the continued flow of lubricating and protecting fluid through the passageway 36, even though the expansion of the fluid causes the sleeve 30 to completely shut off the remainder of the passageway by expanding to the inner periphery of the housing 19.

Turning to Figure 2, the lower portion of the motor shaft 5 above the thrust bearing 17, is supported by a radial bearing sleeve 44 having a bushing 45 and fixed by any suitable means within the motor housing 7. The rotor supporting portion or hub of the shaft 5 is enlarged and solid throughout the major portion of its length, the central passageway 5a of the shaft, terminating near the lower end of the hub 46, as at 47. The periphery of the hub 46 is provided with a series of longitudinally extending, annularly spaced grooves 48 extending from a point on the hub above the upper extremity of the rotor 6 and terminating at their lower ends in a plane spaced slightly above the lower extremity of the rotor. The closed upper end of the shaft's passageway 5a is placed in communication with the lower ends of the grooves 48 by a corresponding series of radial ports 49 whereby, as the motor shaft rotates, the lubricating and protecting fluid which passes upwardly through the passageway 5a from the central tube 28, is caused by centrifugal force to be ejected through the radial ports 49 and grooves 48, into the surrounding area of the housing 7 for return travel to the outer heat exchange passageway 36, through ports 38.

As an added precaution against the leakage of lubricating and protecting fluid from the motor housing 7, or the introduction of the surrounding well fluid into said housing, the conical head 10 of the combination head and base 8, is provided with an auxiliary diaphragm sleeve 50 of generally similar construction and material but smaller than the diaphragm sleeve 30. The adjacent ends of the motor shaft 5 and the pump shaft 4 are connected by a conventional coupling 51, a seal 52 normally preventing lubricating and protecting fluid from the motor housing 7 from passing upwardly beyond the top closure of the motor housing. A pair of tube guides 53 and 54 are concentrically mounted in the upper and lower ends respectively of the conical head 10 and are preferably sealed in their respective openings by conventional O-rings 55. A tube 56 surrounds the lower portion of the pump shaft 4 within the head 10 and is supported at opposite ends in the adapters 53 and 54, in radially spaced relation to the pump shaft 4. The small sleeve diaphragm 50 above referred to, surrounds the tube 56 in radially spaced relation and is secured at its opposite ends around the adapters 53 and 54, by suitable wrappings 57. The interior of the hollow head 10 is in communication with the exterior thereof by means of a tube 58 which is connected at one end through the wall of the head by means of an opening 59, with its opposite end directed toward the pump inlet openings or ports 14.

Thus, should any of the lubricating and protecting fluid expand to a point where it is forced past the seal 52 at the upper end of the motor shaft 5, it would enter the space between the pump shaft 4 and the tube 56 from whence it would flow through port 60 in the adapter 53, into the area within the diaphragm sleeve 50. By expansion and contraction, as in the case of the diaphragm 30, the upper diaphragm sleeve 50 will compensate for pressure differentials between the lubricating and protecting fluid within the sleeve and the area surrounding the sleeve within the head 10, the surrounding well fluid being ejected from or sucked into the hollow head through the pipe 58.

From the foregoing it is believed that the invention may be readily understood by those skilled in the art without further description, it being borne in mind that numerous changes may be made in the details disclosed without departing from the spirit of the invention as set forth in the following claims.

I claim:

1. In a submergible pumping assembly, including a pump unit and a coaxial, oil filled motor unit suspended therefrom with concentrically coupled shafts in respective units; a motor protecting and cooling unit, comprising a housing coaxially connected to said motor unit, a reservoir in said housing for receiving protecting and lubricating fluid, a fluid conducting opening to said reservoir from said motor unit, fluid return means in said reservoir for recirculating said fluid to said motor unit, a flexible diaphragm in said housing establishing a common heat exchange wall between said reservoir and a coextensive, well fluid circulating passageway in said housing, inlet and outlet means for said passageway, communicating with the well area surrounding said housing, said diaphragm being responsive to a pressure differential between the fluid in said reservoir and the surrounding well fluid, and means associated with said motor shaft for circulating lubricating and protecting fluid from said motor unit, through said reservoir and said return means, in heat exchange relation to the well fluid being circulated through said passageway.

2. In a submergible pumping assembly, including a pump unit and a coaxial, oil filled motor unit suspended therefrom with concentrically coupled shafts in respective units; a motor protecting and cooling unit, comprising a cylindrical housing, coaxially connected to said motor unit, a central tube in said housing, closed at its lower end and open at its upper end to the interior of said motor unit, an annular flexible diaphragm surrounding said tube in radially spaced relation thereto and to said housing, said diaphragm defining in said housing, concentric inner and outer annular fluid conducting passageways, inlet means connecting the upper end of said outer passageway to the interior of said motor unit, outlet means connecting the lower end of said outer passageway to the lower end of said central tube, whereby said tube and outer passageway jointly provide a lubricating and protecting fluid reservoir for said motor unit, inlet means at the lower end of said inner passageway for introducing surrounding well fluid, outlet means at the upper end of said inner passageway leading to the surrounding well area, and means associated with the motor shaft for circulating fluid from the motor unit, through said reservoir, in heat exchange relation to the well fluid being circulated through said inner passageway.

3. An assembly as claimed in claim 2, including supporting means within said inner and outer passageways to prevent complete obstruction thereof by either the expansion or collapse of said diaphragm.

4. An assembly as claimed in claim 2, including longitudinally extending, tubular ribs in said inner and outer passageways to limit the expansion and collapse of said diaphragm and to serve as conduits for the limited flow of fluid.

5. An assembly as claimed in claim 2, wherein said motor shaft is longitudinally drilled to provide a central fluid passageway communicating with said central tube, and centrifugal means for circulating lubricating and protecting fluid from said reservoir.

6. An assembly as claimed in claim 5, wherein the hub of said motor is provided with a series of radial ports connected to said central passageway at their inner ends and terminating at their outer ends in communication with a series of longitudinally extending, annularly spaced channels in the periphery of said hub.

7. A combined motor protecting unit and cooling system for a submergible pumping assembly, comprising a cylindrical housing having means at its upper end for coaxial attachment to the lower end of a motor unit to to form the base unit of a submergible oil filled vertical motor and pump assembly, said housing having a coextensive, centrally located, vertical tube, closed at its lower end and communicating at its upper end with the interior of said motor unit, a collapsible diaphragm sleeve enveloping said tube in radially spaced relation to the latter and to said housing, to define within said housing an annular well fluid conduit, inwardly bounded by said tube and immediately surrounded by an annular protecting fluid conduit which is peripherally bounded by said housing, means placing the upper and lower ends of said well fluid conduit in communication with the well fluid surrounding said housing, inlet means placing the upper end of said protecting fluid conduit in communication with the interior of said motor unit, outlet means placing the lower end of the latter conduit in communication with said tube, said diaphragm sleeve being thereby responsive to variations in the pressure differential within and without said housing, means for circulating protecting fluid from said motor unit, through said protecting fluid conduit and tube, in heat exchange relation to the surrounding well fluid and that coursing through said well fluid conduit.

8. A combined motor protecting unit and cooling system as claimed in claim 7, including rigid supporting means within said conduits to prevent complete obstruction thereof by either the expansion or collapse of said diaphragm sleeve.

9. In a submergible pumping assembly, including a pump unit, a coaxial oil filled motor unit, concentrically coupled shafts in respective units, a motor protecting fluid reservoir associated with said motor unit and means in said reservoir for compensating for the pressure differential between the fluid therein and the surrounding well fluid; a unit coupling member, comprising a combined motor unit head and pump unit base, connecting said motor and pump units, said member including an auxiliary pressure compensating chamber having an annular wall surrounding said pump shaft, a coextensive diaphragm sleeve in said chamber enveloping said pump shaft and defining in said chamber an outer zone communicating with the surrounding well fluid and an inner zone sealed off from said outer zone and communicating with the interior of said motor unit, whereby, any lubricating and protecting fluid escaping from said motor unit along said shaft, is confined within said inner zone and the pressure differential between the fluid in said inner zone and said outer zone is compensated for by expansion and contraction of said diaphragm sleeve.

No references cited.